United States Patent [19]

Riser et al.

[11] Patent Number: 5,862,277

[45] Date of Patent: Jan. 19, 1999

[54] MULTIPORT ILLUMINATOR OPTIC DESIGN FOR LIGHT GUIDES

[75] Inventors: Andrew P. Riser, Capistrano Beach; Ronald F. Mathis, Ramona, both of Calif.

[73] Assignee: Remote Source Lighting International, Inc., San Juan Capistrano, Calif.

[21] Appl. No.: 789,972

[22] Filed: Jan. 31, 1997

Related U.S. Application Data

[63] Continuation-in-part of Ser. No. 374,163, Jan. 17, 1995, Pat. No. 5,559,911, Ser. No. 459,613, Jun. 2, 1995, Pat. No. 5,706,306, Ser. No. 599,970, Feb. 14, 1996, Ser. No. 645,324, May 13, 1996, Ser. No. 645,325, May 13, 1996, Pat. No. 5,708,737, Ser. No. 645,326, May 13, 1996, Pat. No. 5,661,828, Ser. No. 645,327, May 13, 1996, Pat. No. 5,682,448, Ser. No. 743,426, Nov. 1, 1996, and Ser. No. 742,846, Nov. 19, 1996, abandoned.

[51] Int. Cl.[6] .................................. G02B 6/32; F21V 7/04
[52] U.S. Cl. ............................. 385/33; 385/31; 385/39; 385/47; 385/147; 385/901; 362/32
[58] Field of Search .......................... 385/15, 31, 33, 385/34, 35, 39, 47, 147, 901; 362/32

[56] References Cited

U.S. PATENT DOCUMENTS

| | | | |
|---|---|---|---|
| 4,050,784 | 9/1977 | Kobayashi | 385/34 X |
| 4,113,347 | 9/1978 | Gaetrner | 385/33 |
| 4,128,302 | 12/1978 | Di Vita | 385/33 |
| 4,302,069 | 11/1981 | Niemi | 385/33 |
| 4,389,698 | 6/1983 | Cibie | 362/32 |
| 4,704,660 | 11/1987 | Robbins | 362/32 |
| 4,727,380 | 2/1988 | Miura et al. | 346/108 |
| 4,795,227 | 1/1989 | Chande | 385/33 |
| 4,811,171 | 3/1989 | Viola | 362/32 |
| 4,811,172 | 3/1989 | Davenport et al. | 362/61 |
| 4,816,975 | 3/1989 | Bahnemann et al. | 362/308 |
| 4,851,969 | 7/1989 | Davenport et al. | 362/61 X |
| 4,868,718 | 9/1989 | Davenport et al. | 362/32 |
| 4,883,333 | 11/1989 | Yanez | 385/33 |
| 4,912,605 | 3/1990 | Whitehead | 362/32 |
| 4,949,227 | 8/1990 | Finch et al. | 362/61 |
| 4,958,263 | 9/1990 | Davenport et al. | 362/32 |
| 4,961,622 | 10/1990 | Gorman et al. | 385/33 X |
| 5,222,793 | 6/1993 | Davenport et al. | 385/32 |
| 5,259,056 | 11/1993 | Davenpoert et al. | 385/115 |
| 5,367,590 | 11/1994 | Davenport et al. | 385/901 X |
| 5,377,287 | 12/1994 | Lee et al. | 385/31 |
| 5,390,265 | 2/1995 | Jiao | 385/15 |
| 5,396,571 | 3/1995 | Saadamanesh et al. | 385/33 |
| 5,416,669 | 5/1995 | Kato et al. | 362/32 |
| 5,436,806 | 7/1995 | Kato | 362/32 |
| 5,499,166 | 3/1996 | Kato et al. | 362/32 |
| 5,509,095 | 4/1996 | Baker et al. | 385/31 |
| 5,559,911 | 9/1996 | Forkner et al. | 385/33 |
| 5,661,828 | 8/1997 | Riser et al. | 385/31 |
| 5,676,445 | 10/1997 | Kato | 362/32 |
| 5,706,376 | 1/1998 | Rykowski et al. | 385/31 |
| 5,708,737 | 1/1998 | Riser | 385/31 |

FOREIGN PATENT DOCUMENTS

| | | | |
|---|---|---|---|
| 63291012 | 11/1988 | Japan | 385/33 |
| 6174963 | 6/1994 | Japan | 385/24 |
| 2623231 | 12/1977 | United Kingdom | 385/39 X |
| 2651283 | 5/1978 | United Kingdom | 362/32 X |
| 2098311 | 11/1982 | United Kingdom | 385/901 X |
| 4309389 | 9/1993 | United Kingdom | 385/33 X |
| 9009607 | 8/1990 | WIPO | 385/33 X |

*Primary Examiner*—Brian Healy
*Attorney, Agent, or Firm*—Donald E. Stolt

[57] ABSTRACT

The inventive system, which is used in transmitting illumination from a central source to a variety of remote locations, efficiently couples the light originating from a lamp, or similar source, into a multiplicity of flexible macroscopic light guides. The combination of the several elements of the inventive system results in a very efficient transfer of the energy of the light source to the light guides. Light from the lamp is fed to four or more ports, with each port having one or more flexible macroscopic light guides connected thereto.

16 Claims, 4 Drawing Sheets

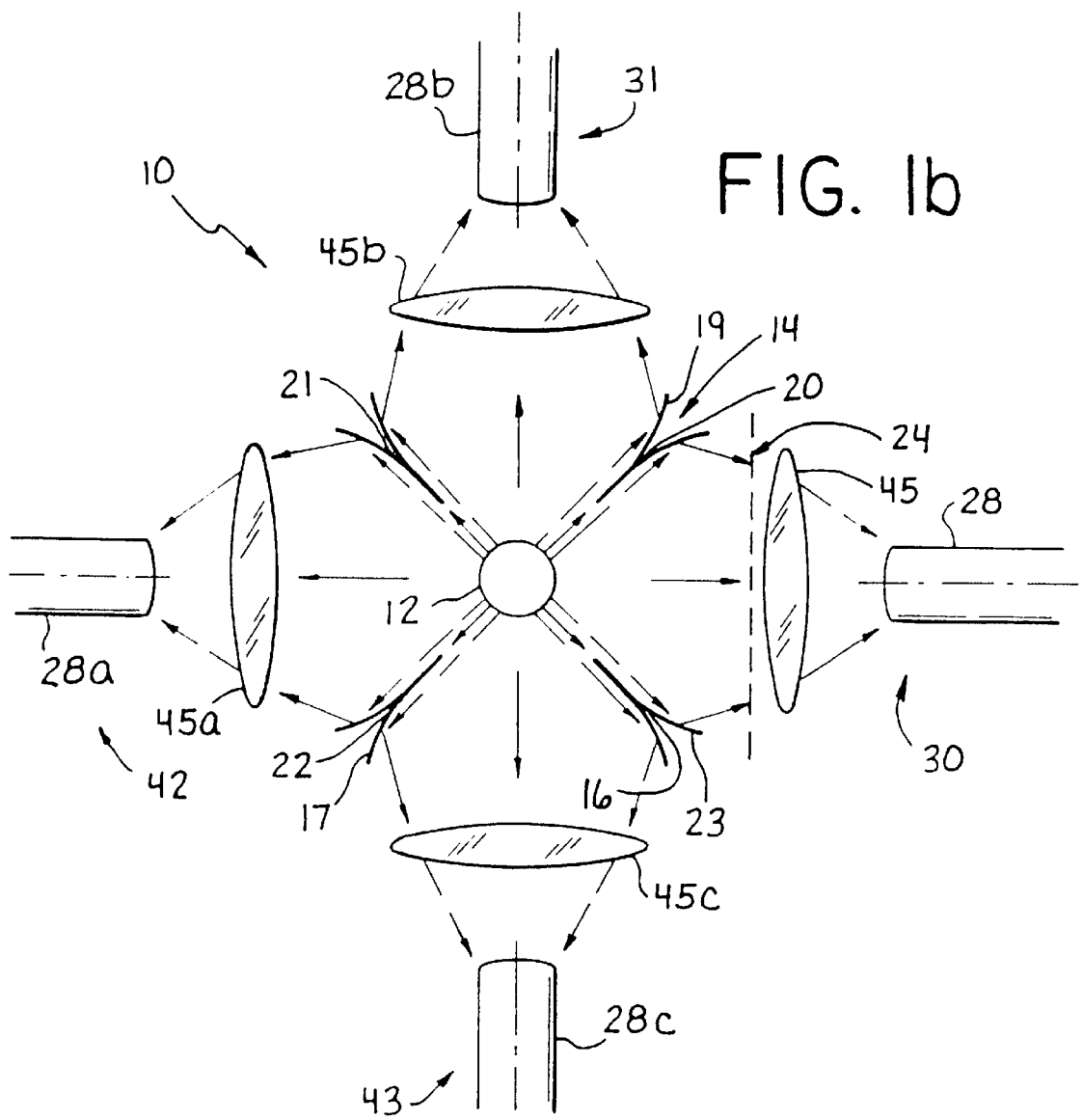

MULTIPORT ILLUMINATOR OPTIC DESIGN FOR LIGHT GUIDES

This application is a continuation-in-part of U.S. application Ser. No. 08/374,163 filed on Jan. 17, 1995 and entitled OPTICAL FIBER COUPLER USING SEGMENTED LENSES, which issued into U.S. Pat. No. 5,559,911 on Sep. 24, 1996; U.S. application Ser. No. 08/459,613 filed on Jun. 2, 1995, now U.S. Pat. No. 5,706,306 and entitled MULTIPORT ILLUMINATOR FOR MACROFIBERS; co-pending U.S. application Ser. No. 08/599,970, pending, filed on Feb.14, 1996 and entitled OPTICAL COUPLER; co-pending U.S. application Ser. No. 08/645,324, pending, filed on May 13, 1996 and entitled MULTIPORT ILLUMINATOR OPTIC DESIGN FOR MACROFIBERS; U.S. application Ser. No. 08/645,325, filed on May 13, 1996, now U.S. Pat. No. 5,708,737, and entitled MULTIPORT ILLUMINATOR MECHANICAL DESIGN FOR MACRO-FIBERS; U.S. application Ser. No. 08/645,326, filed on May 13, 1996, now U.S. Pat. No. 5,661,828, and entitled REFLECTOR FOR ILLUMINATION SYSTEM; U.S. application Ser. No. 08/645,327, filed on May 13, 1996, now U.S. Pat. No. 5,682,448, and entitled REFLECTOR AND ILLUMINATION SYSTEM; co-pending U.S. application Ser. No. 08/743,426, pending, filed on Nov. 1, 1996 and entitled MULTIPORT ILLUMINATOR FOR MACROFIBERS; and U.S. application Ser. No. 08/742,846, filed on Nov. 1, 1996, abandoned, and entitled REFLECTOR AND ILLUMINATION SYSTEM, all nine of which are commonly assigned and the contents of which are expressly incorporated herein by reference. This application is related to co-pending U.S. application Ser. No. 08/792,563, filed on Jan. 31, 1997 and entitled BIPLANAR MULTIPORT ILLUMINATOR OPTIC DESIGN, pending,; and co-pending U.S. application Ser. No. 08/789,965, filed on Jan. 31, 1997 and entitled SPHERICAL MULTIPORT ILLUMINATOR OPTIC DESIGN, pending, both of which are commonly assigned and the contents of which are expressly incorporated herein by reference.

BACKGROUND OF THE INVENTION

1. Field of the Invention

The present invention relates generally to reflectors and, more particularly, to reflectors for coupling light from a light source into one or more light guides.

2. Description of Related Art

Large diameter fiber optics, often referred to as "flexible light guides", are well known in the art, and typically comprise a single, solid core light guide which is surrounded by a cladding layer and a sheath or shielding layer. The core is the portion of a light guide which transmits light, and typically has a diameter of about 2 to 12 mm. It is formed of a very soft, semi-liquid plastic material, such as OPTIFLEX®, which is manufactured by Rohm & Haas Corporation, of Philadelphia, Pa. The cladding layer typically comprises polytetrafluoroethylene (PTFE or TEFLON®), or the like, while the outer sheath is fabricated of a material such as polyvinylchloride (PVC). Unlike small diameter light guides, which are typically used to transmit information in relatively complex control systems, these large diameter "light guides" are typically employed in a variety of illumination systems where direct lighting is difficult to maintain, dangerous, or subject to vandalism. Examples include architectural lighting, display cases, pools and spas (to eliminate electrical connections near water), hazardous material zones (to eliminate the need for sealed lighting), and jail cells. Large diameter light guides are particularly advantageous in that only a single centralized illumination system must be maintained, rather than a plurality of individual lights.

There are problems, however, in implementing state of the art light guide illumination systems because of the difficulty of illuminating a plurality of light guides from a single illumination source, as is discussed in related application Ser. No. 08/374,163. According to one prior art configuration, the light guides are bundled as closely as possible, to ensure the maximum ratio of core area (the part of each light guide which actually transmits light) to total area. However, bundling the large diameter light guides together in order to illuminate them from the single illumination source is difficult to do efficiently. The individual light guides are round and thus have a great deal of space between them due to the cladding and shielding layers. To obtain maximum efficiency, it is desirable to illuminate only the core of each of the bundled light guides, but this is impossible using state of the art bundling techniques. Necessarily, if the light from the source of illumination is spread across the array of light guides, it will illuminate not only the cores of the light guides, but also the cladding layers and shielding layers. Furthermore, the voids between the light guides, which are inevitable because of the light guides' round dimensions, also are impacted by the light from the illumination source. All of the light falling upon any element other than the cores is wasted, and becomes an efficiency loss, since it will not be transmitted by the light guides. Additionally, packing the light guides closely together creates problems such as mechanical difficulties in configuring and accommodating the illumination system and difficulties encountered in attempting to replace one of the individual bundled light guides. This design also typically results in color variation between light guides unless techniques are specifically employed to prevent this problem.

One prior art solution to this problem has been to eliminate the sheathing and cladding layers about each light guide, in order to reduce the area across the bundled array of light guides which does not transmit light. However, there is still a packing factor problem because the light guides are round, and there are other physical disadvantages in eliminating those layers. Thus, this solution is unsatisfactory for most applications.

A number of prior art approaches use reflectors for focussing light from a source of illumination into one or more light guides. U.S. Pat. No. 5,222,793 and U.S. Pat. No. 5,259,056, both to Davenport et al., disclose lighting systems which use a single reflector assembly for illuminating light transmissive elements. U.S. Pat. No. 5,396,571 to Saadatmanesh et al. discloses a multi-segmented lens which divides light from a light beam into four separate beams, each of which is focussed onto a separate optical fiber. U.S. Pat. No. 4,912,605 to Whitehead discloses an electric light source mounted between two reflectors, each of which directs light into a corresponding light guide. U.S. Pat. No. 5,469,337 to Cassarly et al. discloses a light source and a plurality of curved reflectors for focussing light into lenses and then into a plurality of light guides. The use of reflectors and multi-segmented lenses by the prior art for coupling light into light guides has represented some advancement over the prior art bundled light guides, but the need for a proper and efficient coupling of a light source to a plurality of light guides still remains.

In many cases the proper and efficient coupling of a light source to a plurality of light guides changes according to the particular light source being used. Modern electrodeless lamps, for example, which burn very brightly, can be too powerful for coupling to only one or two light guides. If an inefficient coupling is used the effective luminosity may be reduced for a better match with the light guides, but the cost of running the system will then be unreasonably high as a result of the wasted energy. Efficiency is still desired so that the energy associated with generating the high luminosity of such a bright illumination source can be fully utilized.

Another problem associated with prior art designs is the large number of optical components associated with these designs. Reducing the number of parts of any optical design would appear to be advantageous to any system.

SUMMARY OF THE INVENTION

This invention efficiently couples the light originating from a light source into a multiplicity of flexible macroscopic light guides. Such a system is to be used in transmitting illumination from a central source to a variety of remote locations. The combination of the several elements of the inventive system results in a very efficient transfer of the energy of the light source to the light guides. Light from the light source is fed into at least three curved reflectors and then into at least one circular mixing rod, and then directly into a multi-sectored lens. The multi-sector lens then focusses the light into the multiplicity of flexible macroscopic light guides.

According to one aspect of the present invention, an optical illumination system includes a light source and at least three mixing rods. The optical illumination system further includes at least three curved reflectors disposed in proximity to the light source and adapted for reflecting the emitted light from the light source into the at least three mixing rods. The optical illumination system further includes a multi-sectored lens and at least one output light guide for receiving the reflected light from one of the at least three mixing rods and for focussing the light into the at least one output light guide. The at least three mixing rods may consist of four mixing rods, and the at least three curved reflectors may consist of four curved reflectors. Further, the at least one multi-sectored lens may include four multi-sectored lenses, and the at least one output light guide may include at least four light guides. The four curved reflectors are disposed in back-to-back fashion, with each of the four reflectors having an aperture disposed at a center thereof. The light source is disposed at the centers of the four curved reflectors, so that the light source is at the focus of the four curved reflectors.

The at least three curved reflectors, according to another aspect of the present invention, may include up to eight reflectors. This multi-reflector assembly directs light into a corresponding number of mixing rods, which in turn directs light into a corresponding number of multi-sectored lenses. Light from the multi-sectored lenses is then directed into corresponding pluralities of output light guides.

The present invention, together with additional features and advantages thereof, may best be understood by reference to the following description taken in connection with the accompanying illustrative drawings.

BRIEF DESCRIPTION OF THE DRAWINGS

FIGS. 1a and 1b are schematic top views of optical systems according to the present invention;

FIG. 2 is an enlarged schematic view of the lamp and right portion of the quad reflector illustrated in FIG. 1a;

FIG. 3 is a schematic side view illustrating the multi-sector lens which forms a part of the optical system shown in FIG. 1a.

DETAILED DESCRIPTION OF THE PREFERRED EMBODIMENT

Referring now more particularly to the drawings, an optical system 10 is illustrated including a compact light source 12, which may comprise an arc lamp or similar source. The light source 12 is placed at the focus of a quad-curved reflector 14, which comprises four reflector portions 16, 17, 18, and 19 disposed in back-to-back fashion. In each of the reflector portions 16–19, the center or vertex region of the reflector has been removed, as illustrated. The four reflector portions 16–19 can be seen in the figure joined at intersection points 20–23.

Light is emitted from the light source 12, which may comprise, for example, a metal halide lamp, model BA 575 GS, which is manufactured by Sylvania. The light source 12, however, can comprise any conventional means for emitting light. This light source 12 is reflected by the quad reflector 14, as illustrated by the lines of incidence shown in FIG. 1a, in four different directions, and is then directed through an angle of approximately 90 degrees (or any other desired angle) by each of four flat reflectors or fold mirrors.

Figure 1A:
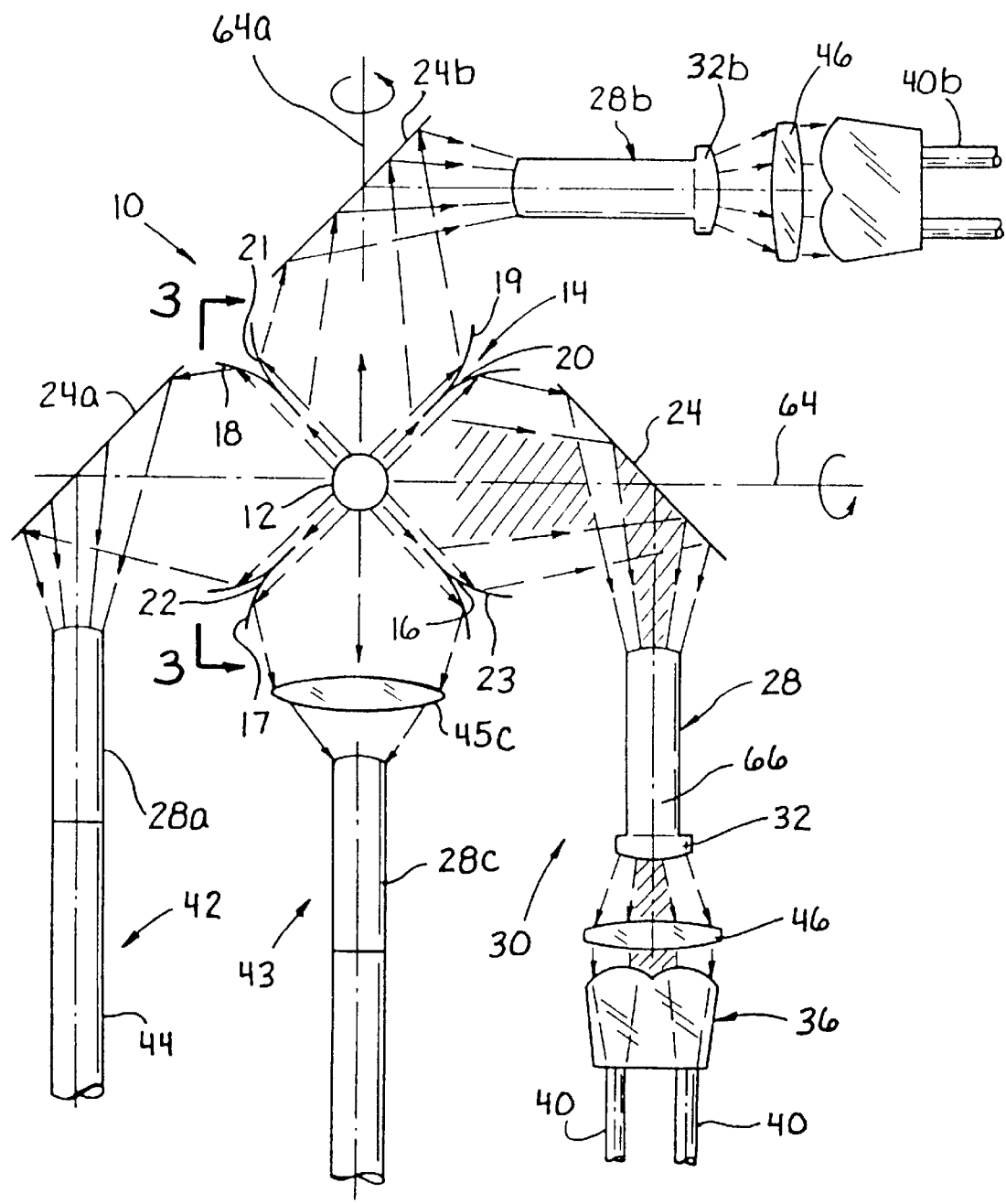

FIG. 1a illustrates three fold mirrors 24, 24a, and 24b corresponding to the three reflectors 16, 18, and 19, respectively. Only three fold mirrors 24, 24a, and 24b are illustrated in FIG. 1a, but up to four fold mirrors may be implemented, one corresponding to each of the reflector portions 16–19. The fold mirrors function to reflect heat generated by the light source 12, and to re-direct the light emitted from light source 12 to output light guides 40. Alternatively, particulary in a linear system using a dual or quad reflector, as illustrated in FIG. 1b, ultra-violet (UV) and/or infrared (IR) radiation blocking coatings may be placed on the exit lens faces 32, since the fold mirrors 24 are not used, or hot mirrors 24' may be used for reflecting UV and IR radiation. The hot mirrors 24' may be placed at any stage between the light source and the output light guides and, further, may be placed at perpendicular or off-axis orientations. Each focussed beam of light impinges on a lens end of a respective one of the circular mixings rod 28, 28a, 28b, and 28c. Each of the four circular mixing rods 28, 28a, 28b, and 28c comprises a transparent material, such as glass or clear plastic, and is adapted to integrate the light beam by means of multiple reflections within the mixing rod. The mixing rods may be omitted in alternative embodiments of the present invention.

Figure 3:
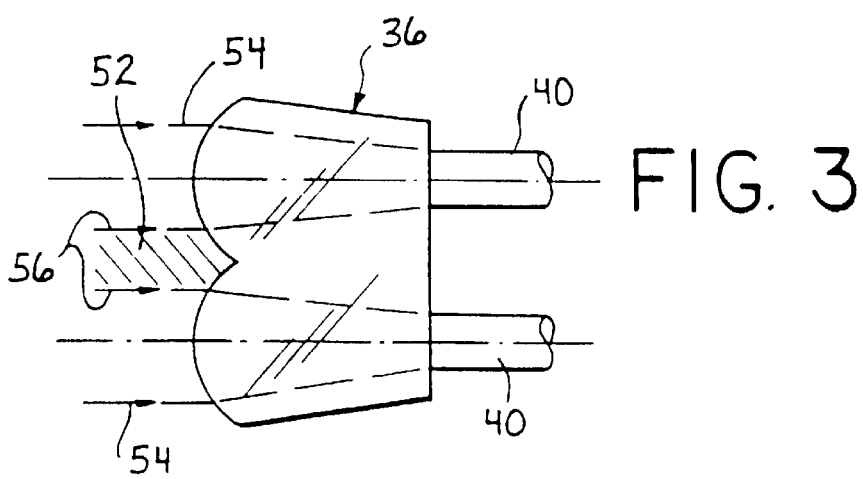
Figure 4:
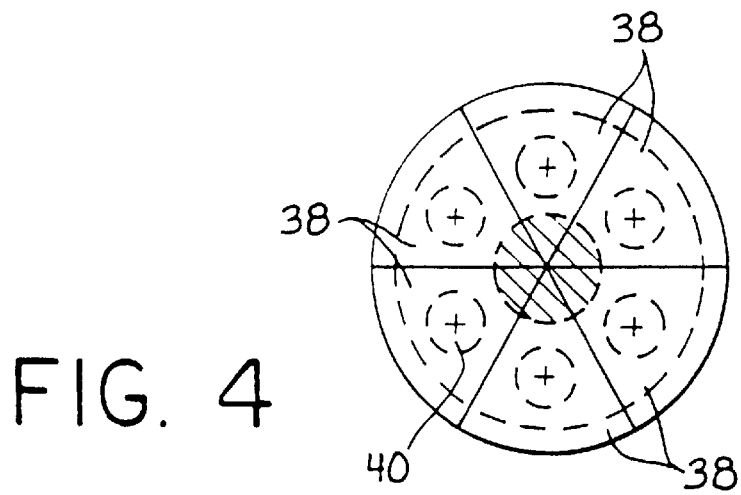
FIG. 4 is an end view of the multi-sector lens shown in FIG. 3.
Figure 5:
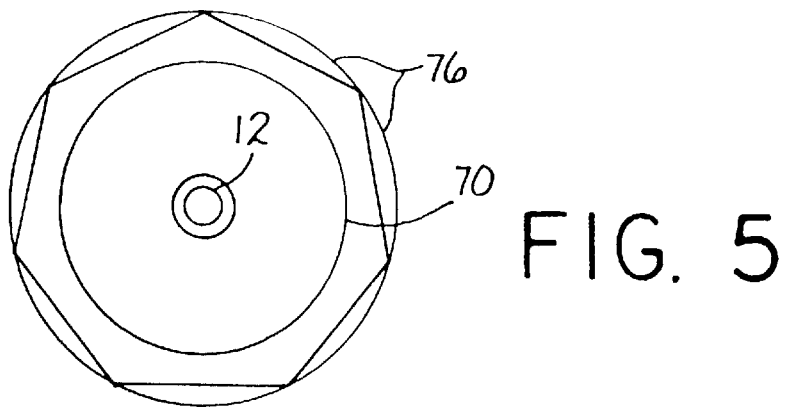
Figure 6:
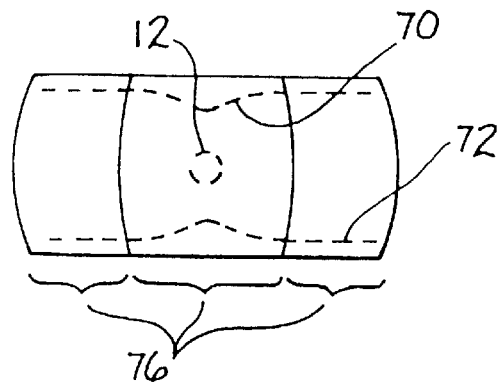

On the right side of the system, or right channel 30, as illustrated in FIG. 1a, the light beam emerges from the mixing rod 28 at the exit lens face 32. The diverging beam from the mixing rod 28 is then focussed and split into a number of separate focussed beams by means of a multi-sectored lens 36 (FIGS. 1a, 3 and 4). Each of the lens sectors 38 (FIG. 4) focusses light onto the core of a corresponding output light guide 40. When an electrodeless lamp or a very high lumen output lamp is used, the light guides preferably comprise fibers which are rated for the proper lumen output. For high-lumen output cases, the fibers will often comprise a non-plastic material.

In a conventional optical design, a focussing lens would likely be required between the circular mixing rod 28 and the multi-sectored lens 36. The multi-sectored lens 36 of the present invention, however, is modified over conventional lenses to obviate any need for a focussing lens. For example, the multi-sectored lens 36 is larger than would be required with a conventional focussing lens between the multi-sectored lens 36 and the circular mixing rod 28. Alternatively, a conventional focussing lens may be used with the multi-sectioned lens 36.

The optical system for the top beam of FIG. 1*a* focussed by the quad reflector 14 through the top channel 31 is essentially the same as that of the right channel 30. The optical system for the left beam focussed by the quad reflector 14 through the left channel 42 can be essentially the same as that described with respect to the right channel 30 or, alternatively, different features may be incorporated into the left channel 42. For example, the right channel 30 or the top channel 31 may have a sector lens accommodating ten output light guides, while the left channel 42 may only couple to a single large light guide or multi-light guide bundle 44. Different features, including combinations of the features illustrated within the right channel 30, the top channel 31, and the left channel 42, may be incorporated and used with any of these channels, in various combinations. Additionally, combinations of these features may be used with the bottom channel 43. The bottom channel 43 is shown with a focussing lens 45*c* and without a fold mirror. As in the presently preferred embodiment of FIG. 1*b*, the focussing lens 45*c* of FIG. 1*a* focusses light from the second reflector portion 17 to the circular mixing rod 28*c*. The focussing lens 45*c* may be used instead of, or in addition to, any of the fold mirrors 24, 24*a*, and 24*b* in the right, left, and top channels 30, 42, and 31, respectively, according to design parameters.

As illustrated in FIG. 1*a*, a rotating color wheel 46 is disposed at the exit of the mixing rod 28 or, alternatively, in front of the sector lens 36. With the color wheel 46 at the mixing rod exit, the color of the light to all of the light guides is the same and changes simultaneously as the wheel rotates. With the wheel near the entrance to the sector lens 36, the colors to each light guide are different and can change at different rates depending on the pattern of the wheel. These various color controls are useful in pool lighting, signs, and other applications.

The high efficiency of this illumination system derives from the special design of a number of its elements working alone and in combination. In a preferred embodiment, the light source 12 is preferably selected to have small arc dimensions so that it will couple into light guides of relatively small diameter (preferably 3 mm to 10 mm). The quad-curved reflector 14 consists of four axially symmetrical curved halves or portions 16–19, with the light source 12 centered at their matching plane. This arrangement makes use of the very efficient collection properties of the low magnification section of the ellipsoidal (or near ellipsoidal) reflector shape. A large hole 48 in the center of each of the four reflector portions 16–19 results in a focussed light beam with a ring-shaped cross section. Light entering the hole in each reflector portion is not lost but passes into the opposite reflector portion and is focussed into the second focussed beam. This reflector arrangement efficiently generates a ring cross-section beam which is very useful in reducing the radial aperture required of each of the sector lenses 38 (FIG. 4).

Figure 2:
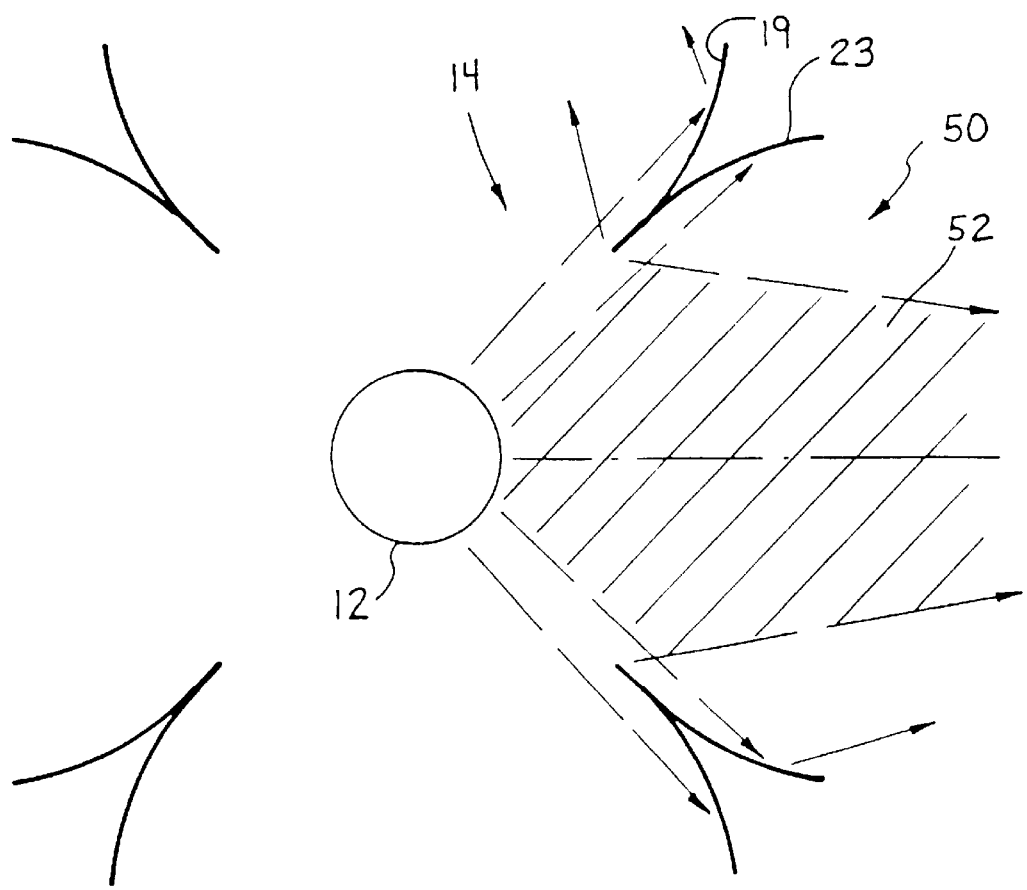

FIG. 2 shows a section through the right portion of the quad-reflector 14 indicating how the ring-shaped beam 50 is generated. The ring-shaped beam 50, wherein the darkened center portion 52 is represented by cross-hatching, is preserved through the mixing rod 28.

As shown best in FIG. 3, the ring-shaped beam impinges on the sector lens 36 as well, and it can be seen that the outer boundary 54 of the beam 50 and the inner boundary 56 thereof, define the lens aperture in the radial direction. The ring beam thus very usefully limits the required lens aperture and permits lenses of relatively short focal length to be used. This ability to use short focal length lenses permits much more efficient coupling into small diameter light guides, thus unexpectedly increasing the efficiency of the system. The minimum light guide diameter is controlled by the need to match the output beam divergence to the numerical aperture of the light guide.

Another feature of the present invention is the orientation of the light source 12. As illustrated particularly in FIG. 2, the light source 12 is shown at the focal point of the dual reflector 14. The long dimension of the arc discharge of the light source 12 is oriented so as to be substantially parallel and coincident with a reflector symmetry axis, which passes through the light source 12 and which is perpendicular to the page on which FIG. 2 is printed. Small output light guide diameter is usually desired in most applications. A design for a small light guide will also, in general, provide efficient coupling to larger light guides provided the numerical aperture of the larger fiber is the same or larger than the smaller fiber. In the presently preferred embodiment, the output light guide core diameter is nominally one half inch. This large diameter is required because the high output power of the light source may burn smaller light guides. Additionally, the sector lens of the present invention, which obviates any need for a focussing lens, has an aspheric shape that can be specified using standard optical equations.

Although six equal lens sectors 38 are illustrated in FIG. 4, the sector lens 36 can have as few as two and up to about twelve or more sectors. Also, the sectors need not be equal in area, since in some applications it may be desirable to deliver different amounts of light to different locations. The sector lens as a means of splitting the incident beam has a major advantage over currently used bundled light guides in that the sector lens array separates the light guides from each other (FIGS. 3 and 4), thereby permitting easy installation and removal of individual light guides.

As previously mentioned, the fold reflectors 24, 24*a*, and 24*b* may serve a multiple function of both folding mirror and heat rejecting mirror. As a folding mirror, they may be used with or without a hot light source 12, and provide the ability of rotating the entire output optical system around mechanical axes 64 and 64*a*, as best shown in FIG. 1*a*. This feature is very useful in allowing great flexibility in positioning the direction in which the light guides emerge from the unit. Independent rotation of the fold mirrors 24 and 24*a*, for example, on either side of the light source 12 provides additional flexibility of output light guide location.

As described above, the circular mixing rod 28 (as well as mixing rods 28*a*, 28*b*, and 28*c*) is used to integrate the angular distribution of the light around the rod axis 66. This is advantageous since it allows the light output of each light guide to be identical (which is usually desired), because the angular light distribution from the light source 12 is not generally uniform. Additionally, a metal-halide type of arc lamp, which may be used, typically has some color differences in the angular distribution which also need to be integrated out in order to avoid undesirable color differences in output between light guides. A field lens 32, for example, is preferably employed on each of the mixing rod ends to constrain the light inside the rod so that it is totally reflected internally. Mechanically, the field lens portion 32 of the mixing rod 28 is larger in diameter than the rod section itself in order to provide a loss-free means of mounting the mixing rod 28. Anything touching the mixing rod surface will bleed off some of the internally reflected light unless the rod is clad, which is a disadvantageous approach since it reduces its numerical aperture and increases its cost. Each mixing rod may be coated with a low-index material according to one embodiment of the present invention.

The individual lens sectors 38 (FIG. 4) comprise a relay lens system that roughly images the output end of the mixing rod onto the light guide port. The lens sectors may have aspheric shapes to reduce aberrations and improve efficiency, and are preferably given a thickness such that the output beam is focussed on the flat rear surface of the lens sector. This allows the soft core of the usual type of light guide to "wet" the lens surface, thereby reducing reflection losses at this interface. In another embodiment of the present invention, air gaps can be maintained between the light guides 40 and the lens sector 38 surfaces.

The quad-curved reflector 14 illustrated in FIG. 1*a* may be expanded or reduced to add more or less curved reflectors. For example, three curved reflectors or eight curved reflectors may be embodied, instead of four curved reflectors. The number of curved reflectors (ports) will be dependent upon the particular system requirements. Each curved reflector, corresponding to a port, is independent of the other ports and, accordingly, can be coupled to one or several light guides, mixing rods, or light guides. The largest number of curved reflectors, or ports, will often be determined by the size limitations of the focussing optics, such as the focussing lenses, for example.

Although exemplary embodiments of the invention have been shown and described, many other changes, modifications and substitutions, in addition to those set forth in the above paragraphs, may be made by one having ordinary skill in the art without necessarily departing from the spirit and scope of this invention.

We claim:

1. A light guide illumination system, comprising:
    a light source for emitting light;
        at least three curved reflectors disposed in proximity to the light source;
    at least one multi-sectored lens; and
    at least one output light guide, the at least one multi-sectored lens being adapted for receiving reflected light from said light source and for focussing the light into the at least one output light guide.

2. The light guide illumination system as recited in claim 1, wherein
    the at least three curved reflectors comprise four curved reflectors.

3. The light guide illumination system as recited in claim 2, the at least one multi-sectored lens comprising four multi-sectored lenses, and
    the at least one output light guide comprising at least four output light guides, the four multi-sectored lens being adapted for receiving reflected light from the light source and for focussing the light into the at least four output light guides.

4. The light guide illumination system as recited in claim 2, the four curved reflectors comprising four curved surfaces which are disposed in a back-to-back fashion.

5. The light guide illumination system as recited in claim 4, each of the four curved surfaces comprising an aperture disposed at a center of the curved surface.

6. The light guide illumination system as recited in claim 5, the light source being disposed at the centers of the four curved surfaces.

7. The light guide illumination system as recited in claim 6, the light source being placed at a focus of the four curved reflectors.

8. A light guide illumination system, comprising:
    a light source for emitting light;
    at least three mixing rods;
    at least three curved reflectors disposed in proximity to the light source, the at least three curved reflectors being adapted for reflecting the emitted light from the light source into the at least three mixing rods;
    a multi-sectored lens; and
    at least one output light guide, the multi-sectored lens being adapted for receiving the reflected light from one of the at least three mixing rods and for focussing the light into the at least one output light guide.

9. A light guide illumination system, comprising:
    a light source adapted for emitting light;
    a multi-reflector comprising at least three curved surfaces, the multi-reflector being disposed in proximity to the light source and being adapted for reflecting the light emitted from the light source; and
    a multi-sectored lens, the multi-sectored lens being adapted for receiving the reflected light from the multi-reflector and for focussing the light into at least one output light guide.

10. The light guide illumination system as recited in claim 9, the multi-reflector being adapted for reflecting the emitted light from the light source into at least one mixing rod.

11. The light guide illumination system as recited in claim 9, the multi-reflector comprising four curved surfaces which are disposed in a back-to-back fashion.

12. The light guide illumination system as recited in claim 11, each of the four curved surfaces having an aperture disposed at a center of the curved surface.

13. The light guide illumination system as recited in claim 12, the light source being disposed at the centers of the four curved surfaces.

14. The light guide illumination system as recited in claim 9, the light source being placed at a focus of the multi-reflector.

15. A light guide illumination system, comprising:
    a light source for emitting light;
    four mixing rods;
    four curved reflectors disposed in proximity to the light source, the four curved reflectors being adapted for reflecting the emitted light from the light source into the four mixing rods;
    at least one multi-sectored lens; and
    at least one output light guide, the at least one multi-sectored lens being adapted for receiving the reflected light from one of the mixing rods and for focussing the light into the at least one output light guide.

16. The light guide illumination system as recited in claim 15;
    the at least one multi-sectored lens comprising at least four multi-sectored lenses, and
    the at least one output light guide comprising at least four output light guides, the four multi-sectored lens being adapted for receiving the reflected light from the four mixing rods and for focussing the light into the at least four output light guides.

* * * * *